United States Patent
Jarvis et al.

(10) Patent No.: US 6,948,009 B2
(45) Date of Patent: Sep. 20, 2005

(54) METHOD, SYSTEM, AND ARTICLE OF MANUFACTURE FOR INCREASING PROCESSOR UTILIZATION

(75) Inventors: Thomas Charles Jarvis, Tucson, AZ (US); Steven Robert Lowe, Tucson, AZ (US); Sam Clark Werner, Tucson, AZ (US); William Dennis Williams, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 174 days.

(21) Appl. No.: 10/163,219

(22) Filed: Jun. 4, 2002

(65) Prior Publication Data

US 2003/0225948 A1 Dec. 4, 2003

(51) Int. Cl.⁷ ............................. G06F 3/00; G06F 13/00
(52) U.S. Cl. ............................ 710/17; 710/5; 710/31; 710/32; 710/39; 712/405
(58) Field of Search ............................. 710/5, 17, 31, 710/32, 39; 712/405

(56) References Cited

U.S. PATENT DOCUMENTS

| 4,779,194 A | * | 10/1988 | Jennings et al. ............ 718/106 |
| 4,807,228 A | * | 2/1989 | Dahbura et al. ............ 714/13 |
| 5,361,362 A | * | 11/1994 | Benkeser et al. ........... 718/102 |
| 5,737,747 A | | 4/1998 | Vishlitzky et al. |
| 5,867,685 A | | 2/1999 | Fuld et al. |

(Continued)

FOREIGN PATENT DOCUMENTS

| DE | 19630252 A1 | * | 1/1998 | ............ H04M/7/00 |
| JP | 07141208 A | * | 6/1995 | ............ G06F/9/46 |
| JP | 2001216110 A | * | 8/2001 | ............ G06F/3/12 |
| JP | 2002157234 A | * | 5/2002 | ......... G06F/15/177 |
| KR | 2001045567 A | * | 6/2001 | ........... G06F/15/16 |

OTHER PUBLICATIONS

A. Varma et al., "Destage Algorithms for Disk Arrays with Non–Volatile Caches", Computer Engineering Dept, University of California Santa Cruz, online, Retrieve on Jun. 4, 2002. Retrieved from the Internet at URL: [Retreive on Jun. 4, 2002]. Retrieved from the Internet at URL: <http://www.citeseer.nj.nec.com/varma95destage.html>.
B. Worthington, et al., "Scheduling Algorithms for Modern Disk Drives", Proceedings of ACM Sigmetrics Conference, May 1994, pp. 241–251.
M. Blunden, et al., "Enterprise Storage Solutions Handbook", IBM Corp., Jan. 2001, Chapter 1, pp. 1–13.
IBM, Corp. "Open Systems, Storage, and Performance—for the Mainframe Mind" online, pp. 1–11. [Retrieved on Jan. 28, 2002]. Retrieved from the Internet at URL: <http://www.storage.ibm.com/hardsoft/diskdrls/technolo/open.htm>.
IBM, Corp. "A Functional View of the ESS Disk Subsystem" online, pp. 1–4. [Retrieved on Jan. 28, 2001]. Retrieved from the Internet at URL: [. http://wwwhttp://www.storage.ibm.com/software/storrwatch/ess/overview/vshmp03 essfunct. html].

*Primary Examiner*—Jeffrey Gaffin
*Assistant Examiner*—Angel L. Casiano
(74) *Attorney, Agent, or Firm*—Rabindranath Dutta; Konrad Raynes & Victor LLP

(57) ABSTRACT

Provided are a method, system, and program for increasing processor utilization. A list of work is divided for processing among a plurality of processes, wherein a process is allocated a part of the list of work to process, and the processes execute in parallel. If a process completes the list of work allocated to the process then the process is made available on an available process queue. Before a process performs any work, the process reads the available process queue and determines if any process is available to share the work. If so, the work is split up between the examining process and the available process. In one implementation, the work involves scanning a cache and if necessary destage data.

24 Claims, 6 Drawing Sheets

U.S. PATENT DOCUMENTS 5,900,009 A    5/1999    Vishlitzky et al.
5,987,566 A    11/1999   Vishlitzky et al.
6,076,147 A  * 6/2000    Lynch et al. ................ 711/146
6,134,649 A  * 10/2000   Witt ........................... 712/204
6,185,659 B1   2/2001    Milillo et al.
6,192,450 B1   2/2001    Bauman et al.

* cited by examiner

METHOD, SYSTEM, AND ARTICLE OF MANUFACTURE FOR INCREASING PROCESSOR UTILIZATION

BACKGROUND OF THE INVENTION

1. Field of the Invention

The present invention relates to a method, system, and article of manufacture for increasing processor utilization.

2. Description of the Related Art

A storage subsystem, such as the International Business Machines ("IBM") Enterprise Storage Server ("ESS")**, may receive Input/Output (I/O) requests directed toward an attached storage system. The attached storage system may comprise an enclosure including numerous interconnected disk drives, such as a Direct Access Storage Device ("DASD"), a Redundant Array of Independent Disks ("RAID" Array), Just A Bunch of Disks ("JBOD"), etc.

**IBM and Enterprise Storage Server are trademarks of International Business Machines Corp.

The storage subsystem may have a cache comprising of one or more gigabytes of volatile storage, e.g., Random Access Memory (RAM), Dynamic Random Access Memory (DRAM), etc. If the storage subsystem receives I/O requests at a rate exceeding the processing capability of the I/O requests at the storage subsystem, the storage subsystem may queue the I/O requests in the cache. A copy of certain modified (write) data may also by placed in the cache. Data may also be automatically prefetched into the cache to quickly satisfy read requests.

The cache may need to be scanned periodically. Scanning a cache may be in response to a host command or may be as a result of automatic error handling behavior activity. During scanning of a cache, the tracks associated with the cache are examined and appropriate actions taken. The appropriate actions may include destage of data from the cache, discarding of data from the cache etc. The appropriate actions may also vary depending on the type of scanning being performed on the cache.

Since the scanning of a cache is a time-consuming operation, particularly when the cache size is large, there is a need in the art for improved techniques for scanning data in cache.

SUMMARY OF THE PREFERRED EMBODIMENTS

Provided are a method, system, and article of manufacture for increasing processor utilization. Operations are initially assigned to a plurality of processes. A process is added to an available process queue when the process completes processing the operations. A determination is made as to whether one or more processes are available in the available process queue if there are operations that have not been processed. If one or more processes are determined to be available, then operations that have not been processed are allocated between the process and at least one of the available processes.

In one implementation, the operations are scan operations, wherein the scan operations scan a part of a cache. In an additional implementation, the operations are allocated from a list, wherein the list comprises a hash table, wherein an entry of the hash table has a pointer to a cache directory control block, and wherein the cache directory control block corresponds to a portion of the cache. In another implementation, after determining that no process is available in the available process queue, tracks corresponding to one operation not processed are destaged.

In another implementation, the operations are assigned substantially equally among the processes, and wherein the operations not processed are allocated substantially equally between the process and the at least one of the available processes. In another implementation, the processes run on a plurality of central processing units. In a still further implementation, the processes execute in parallel to process the assigned operations.

The implementations increase processor utilization in a variety of applications, including cache scanning applications. Processes enter an available process queue after completing assigned operations and are reused to perform operations not completed by other processes.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
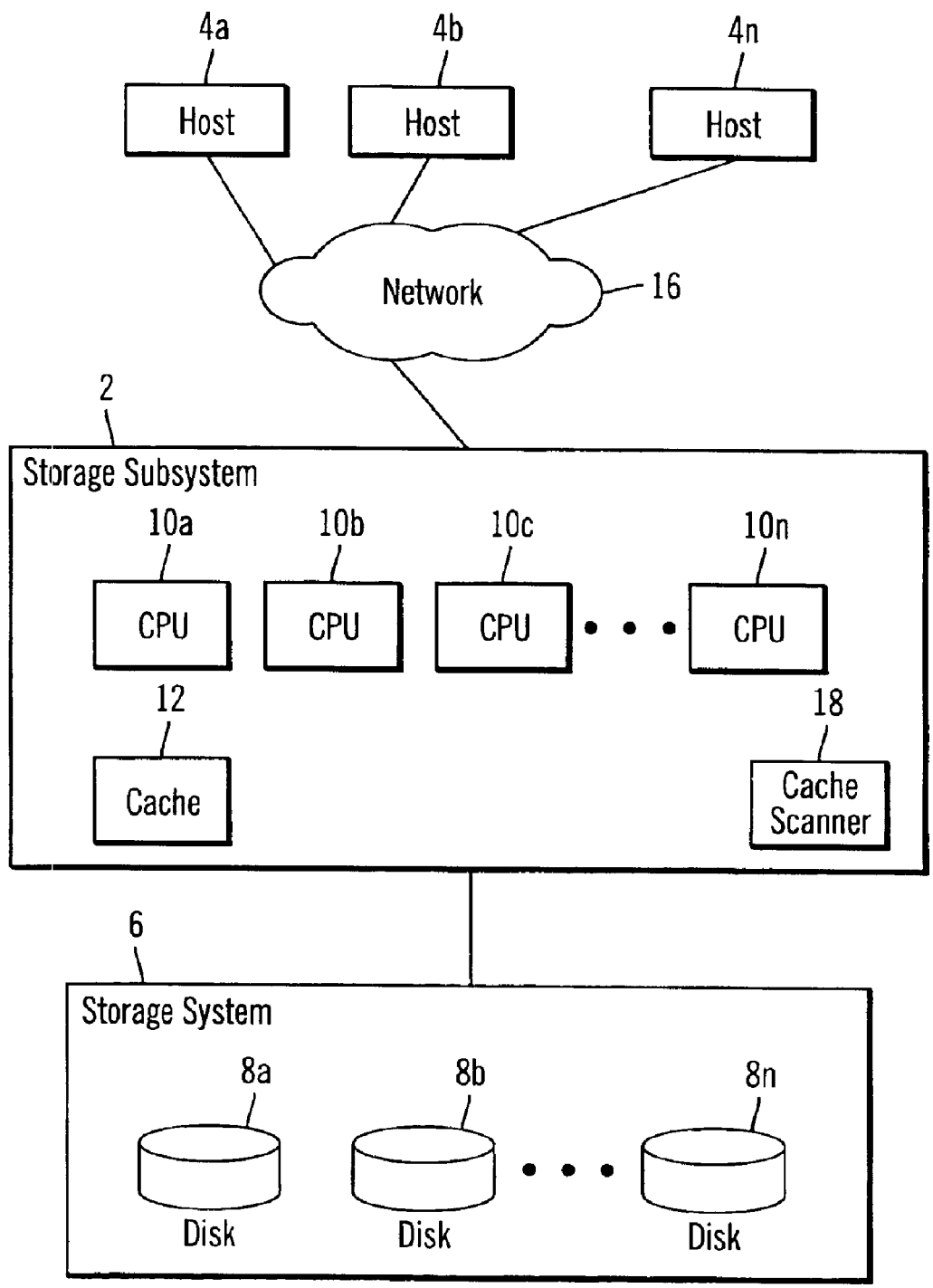
FIG. 1 illustrates a first computing environment in which certain aspects of the invention are implemented.

FIG. 1 illustrates a computing environment in which aspects of the invention are implemented. A storage subsystem 2 receives I/O requests from hosts 4a, 4b . . . 4n directed to tracks in a storage system 6, which comprises one or more hard disk drives 8a, 8b . . . 8n. The storage system 6 and disk drives 8a, 8b . . . 8n may be configured as a DASD, one or more RAID ranks, etc. The storage subsystem 2 further includes one or more central processing units (CPUs) 10a, 10b, 10c . . . 10n and a cache 12 comprising a volatile memory to store tracks. The hosts 4a, 4b . . . 4n communicate I/O requests to the storage subsystem 2 via a network 16, which may comprise any network known in the art, such as a Storage Area Network (SAN), Local Area Network (LAN), Wide Area Network (WAN), the Internet, an Intranet, etc. The cache 12 may be implemented in one or more volatile memory devices.

A cache scanner 18 comprises either a hardware component or program executed by one or more of the CPUs 10a, 10b . . . 10n. The cache scanner 18 scans the cache 12. The cache scanner 18 may alternatively be a part of another hardware component or be included in another software program. Scanning the cache may comprise performing operations such as destaging data from the cache, discarding data from the cache, skipping over data in the cache after reading the data etc.

Figure 2:
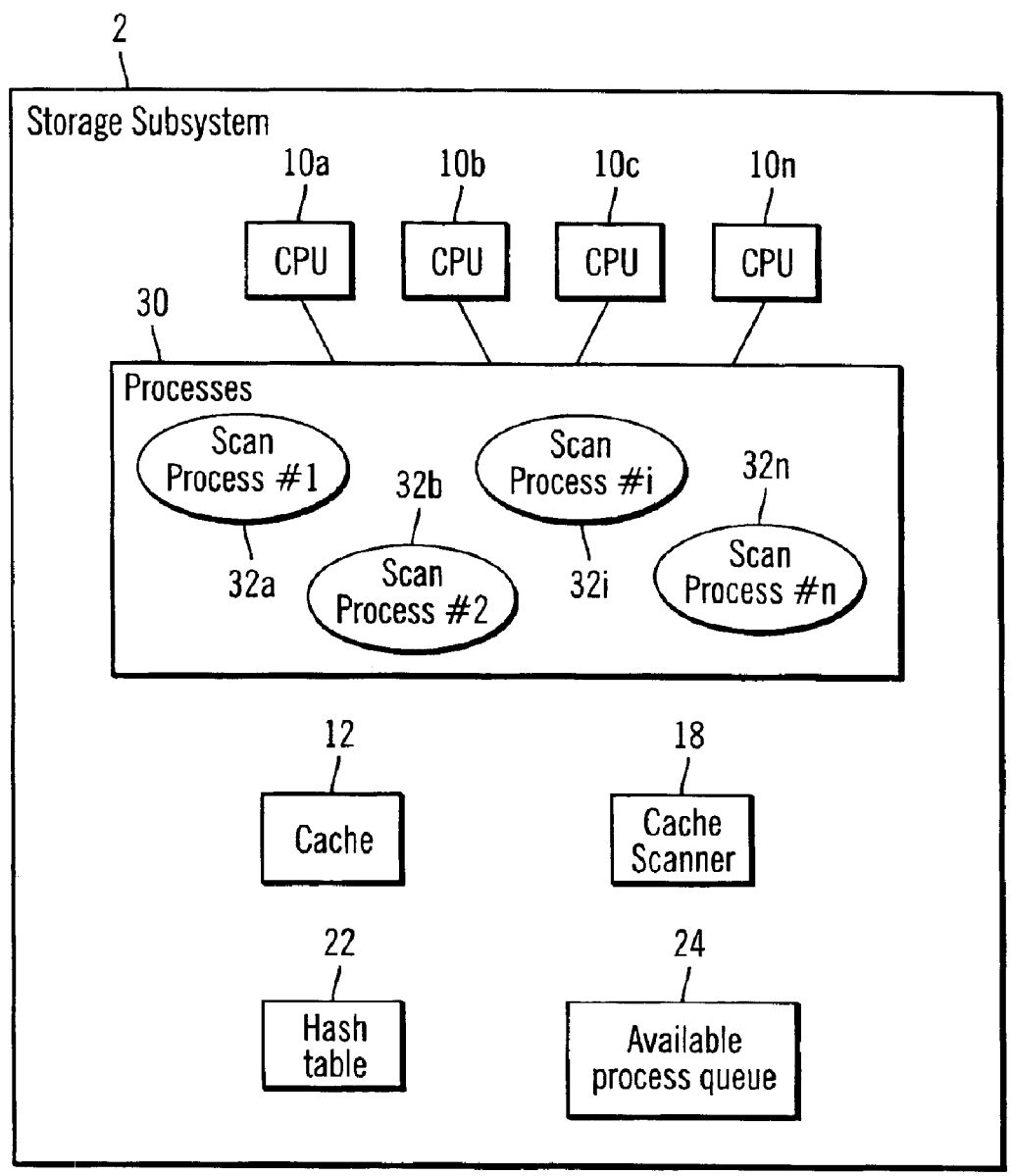
FIG. 2 illustrates program components used to scan a cache in accordance with certain implementations of the invention.

FIG. 2 illustrates program components used to scan the cache 12 in accordance with implementations of the invention. FIG. 2 illustrates a hash table 22 associated with the cache 12. The hash table 22 includes information on the cache 12, and in particular contains information regarding the tracks associated with cache 12.

The CPUs 10a, 10b . . . 10n may execute processes 30 to perform various operations. The processes 30 may include a plurality of scan processes 32a, 32b, . . . 32n as well as other processes. Each scan process 32a, 32b, . . . 32i, . . . 32n scans a part of the cache 12. Each scan process 32a, 32b, . . . 32n may be listed in an available process queue 24. In one implementation, the processes 30 are executed on any CPU 10a, 10b, . . . 10n that are available. In another implementation, the scan processes 32a, 32b, . . . 32n may execute concurrently on multiple CPUs 10a, 10b, . . . 10n. If only a single CPU is available then the processes 30 execute on the single CPU. In some implementations, the CPUs 10a, 10b, 10n may also execute other processes besides the scan processes 32a, 32b, . . . 32n.

Figure 3:
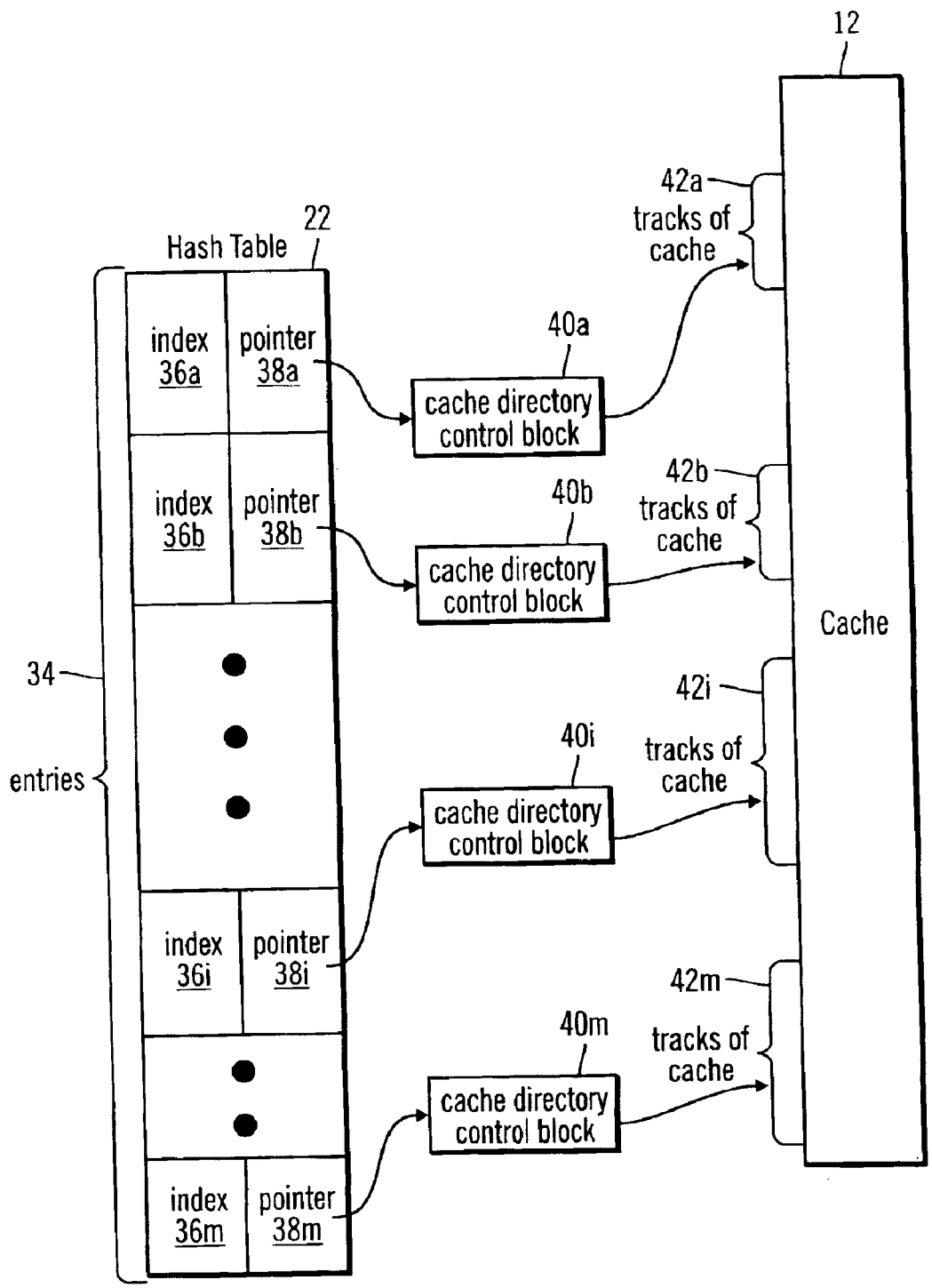
FIG. 3 illustrates the fields in a hash table corresponding to a cache in accordance with certain implementations of the invention.

FIG. 3 illustrates the fields in the hash table 22 corresponding to the cache 12 in accordance with certain implementations of the invention. The hash table 22 contains entries 34, where each entry has an index 36a, 36b, . . . , 36i, . . . 36m and a corresponding pointer 38a, 38b, . . . 38i, . . . 38m, and where a representative index 36i is associated with a corresponding pointer 38i. Each pointer 38a, 38b, . . . 38i, . . . 38m points to a corresponding cache directory control block 40a, 40b, . . . 40i, . . . 40m, where a representative pointer 38i points to a cache directory control block 40i. A cache directory control block 40a, 40b, . . . 40i, . . . 40m contains pertinent information about corresponding tracks 42a, 42b, . . . 42i, . . . 42m in the cache 12, where a representative cache directory control block 40i contains all pertinent information about the corresponding tracks 42i in the cache 12. The information in the cache directory control block 40i is adequate to find all the data related to the tracks 42i in the cache 12. In aggregate, the hash table entries 34 include information on all tracks in the cache 12.

Figure 4:
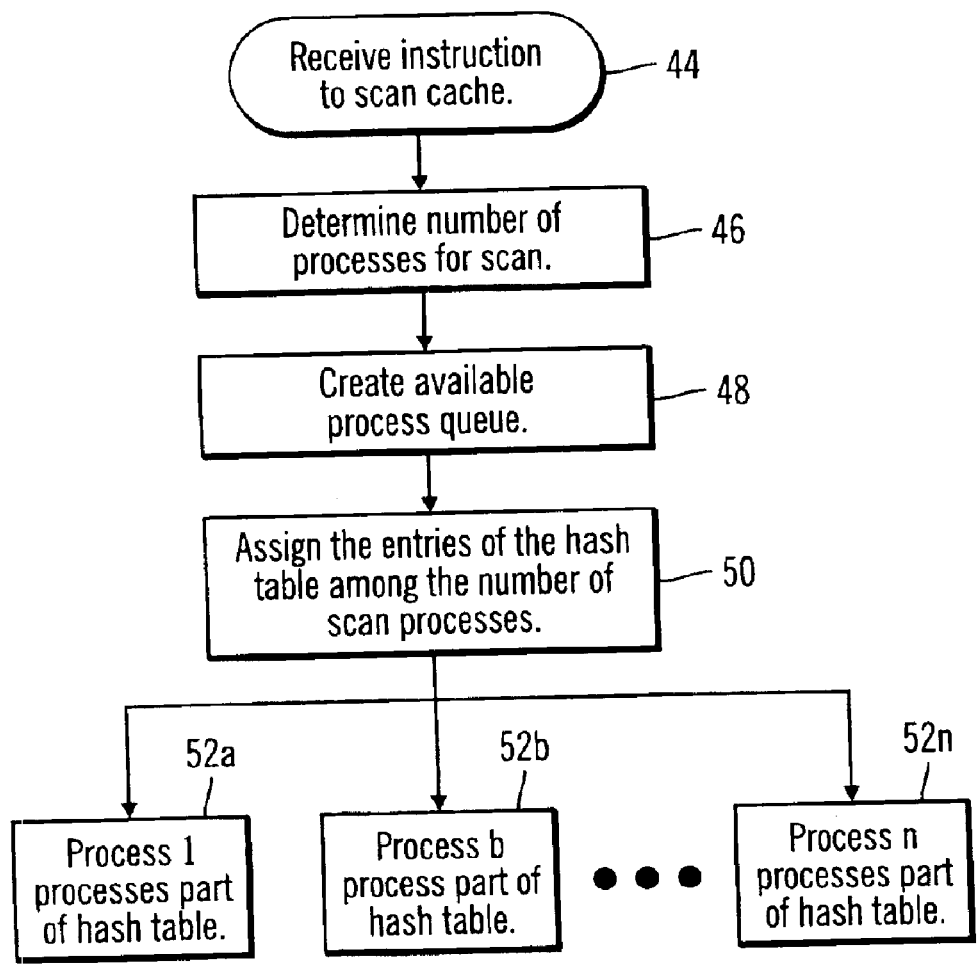
FIG. 4 illustrates logic to divide the scan of a cache among a plurality of processes in accordance with certain implementations of the invention.

FIG. 4 illustrates logic to divide the scan of the cache 12 among the plurality of scan processes 32a, 32b, . . . 32n in accordance with certain implementations of the invention. The process starts at block 44 where the cache scanner 18 receives an instruction to scan the cache 12. In alternative implementation, instead of receiving an instruction, the cache scanner may generate an instruction to scan the cache 12 under various conditions such as in response to an error condition, at periodic intervals etc. Control proceeds to block 46, where the cache scanner 18 determines the number of scan processes 32a, 32b, . . . 32n for the scanning of the cache 12. The number of scan processes may be statically determined. The static determination may include predetermination of the number of scan processes, preconfiguration of the number of scan processes etc. Alternately, the number of scan processes may be dynamically determined based on factors such as the size of the cache 12, the number of available CPUs 10a, 10b, . . . 10n, the amount of memory available for processing, processor speed of the available CPUs 10a, 10b, . . . 10n etc. The number of scan processes may also change over time.

Control proceeds to block 48, where the cache scanner 12 creates the available process queue 24 for scanning the cache 12. The available process queue 24 is initially empty. The scan processes 32a, 32b, . . . 32n can enter or exit the available process queue 24. At block 50, the cache scanner 12 assigns the entries 34 of the hash table 22 among the scan processes 32a, 32b, . . . 32n. In one implementation the assigning is such that the entries 34 of the hash table 22 are divided up substantially equally among the scan processes 32a, 32b, . . . 32n. Assigning the entries 34 substantially equally among the scan processes 32a, 32b, . . . 32n does not imply that each scan process 32a, 32b, . . . 32n will be able to scan the tracks associated with the assigned entries in a substantially equal amount of time as each track may have different operations performed on the track. For example, data on some tracks may have to be destaged during the scanning process. As a result, the entry corresponding to the tracks whose data is destaged may require relatively more time to complete.

Control proceeds to blocks 52a, 52b, . . . 52n where each scan process 32a, 32b, . . . 32n processes the entries 34 of the hash table 22 assigned to the scan processes 32a, 32b, . . . 32n. For example, at block 52a, scan process 32a processes those entries assigned to scan process 32a at block 50.

Figure 5:
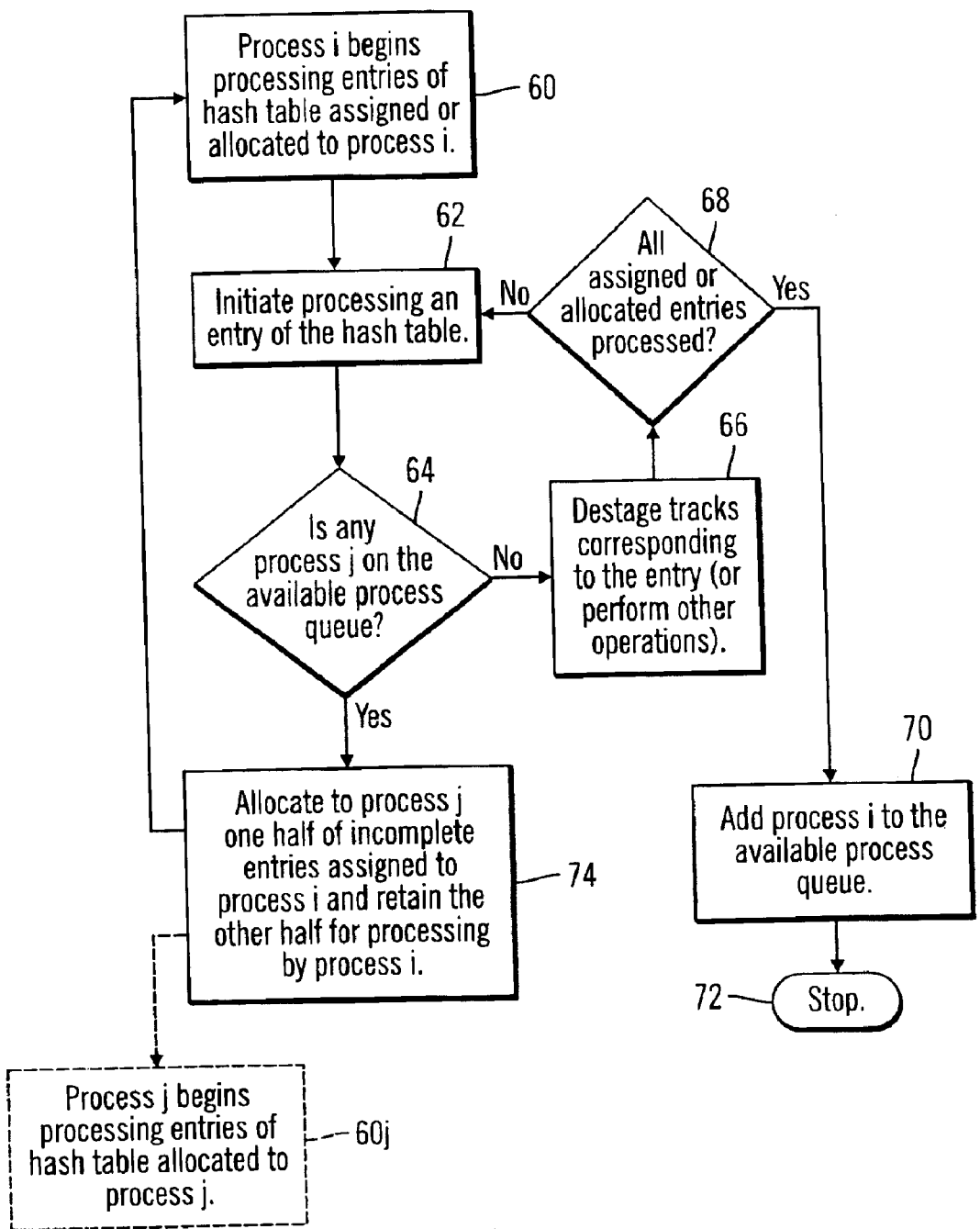
FIG. 5 illustrates logic for a process scanning a cache in accordance with certain implementations of the invention.

FIG. 5 illustrates logic for a scan process 32i scanning the cache 12 in accordance with certain implementations of the invention. Each scan process 32a, 32b, . . . 32i, . . . 32n initiated at blocks 52a, 52b, . . . 52n performs the process illustrated in FIG. 5. At block 60, the scan process 32i begins processing those entries of the hash table 22 assigned or allocated to that process 32i at block 50 of FIG. 4. Control proceeds to block 62, where the scan process 32i initiates processing an entry of the hash table 22 assigned to scan process 32i. Control proceeds to block 64, where the scan process 32i determines if any scan process j is available on the available process queue 24. If not, control proceeds to block 66 where the scan process 32i may destage tracks or perform other operations on tracks corresponding to the entry whose processing is initiated at block 62. In many situations, no operations are performed at block 66. The operations performed depend on the information in the cache directory control block 40i corresponding to the entry whose processing is initiated at block 62. Control proceeds to block 68, where the scan process 32i determines if all entries assigned or allocated to the scan process 32i have been processed. If so, scan process 32i adds (at block 70) the scan process 32i to the available process queue 24 and stops (at block 72). If not, control returns block 62 where the scan process 32i initiates the processing of a next entry of the hash table assigned or allocated to scan process 32i.

If at block 64, a scan process j is available on the available process queue control proceeds to block 74. The scan process 32i divides the entries of the hash table remaining to be processed (including the entry whose processing was initiated at block 62) by scan process 32i into two and allocates one half of the entries to scan process j and retains the other half of the entries for scan process 32i. Control returns to block 60, where the scan process 32i begins processing the entries of the hash table retained by scan process 32i at block 74. Simultaneously with the control proceeding to block 60, control proceeds to block 60j, where the scan process j removes scan process j from the available process queue 24 and begins processing entries of the hash table 22 allocated to scan process j at block 74.

In the implementation when a scan process 32i completes processing the entries of the hash table 22 allocated to the scan process 32i, the scan process 32i enters the available process queue 24. While processing entries if a scan process 32$i$ determines that there are available scan processes in the available process queue 24, the scan process 32$i$ divides the incomplete entries with at least one scan process in the available process queue 24. The cache scanner 18 uses all scan processes 32$i$ effectively and processor utilization increases when compared to the situation where the entries of the hash table 22 are not reallocated at block 74. The implementations described in FIG. 1 to FIG. 5 can be modified such that they apply to other systems besides storage subsystems.

Figure 6A:
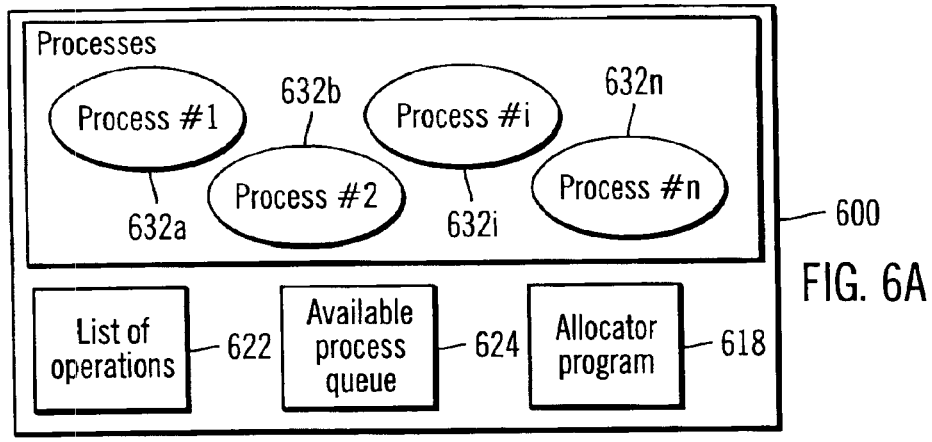
FIG. 6a illustrates a second computing environment in which certain aspects of the invention are implemented.
Figure 6B:
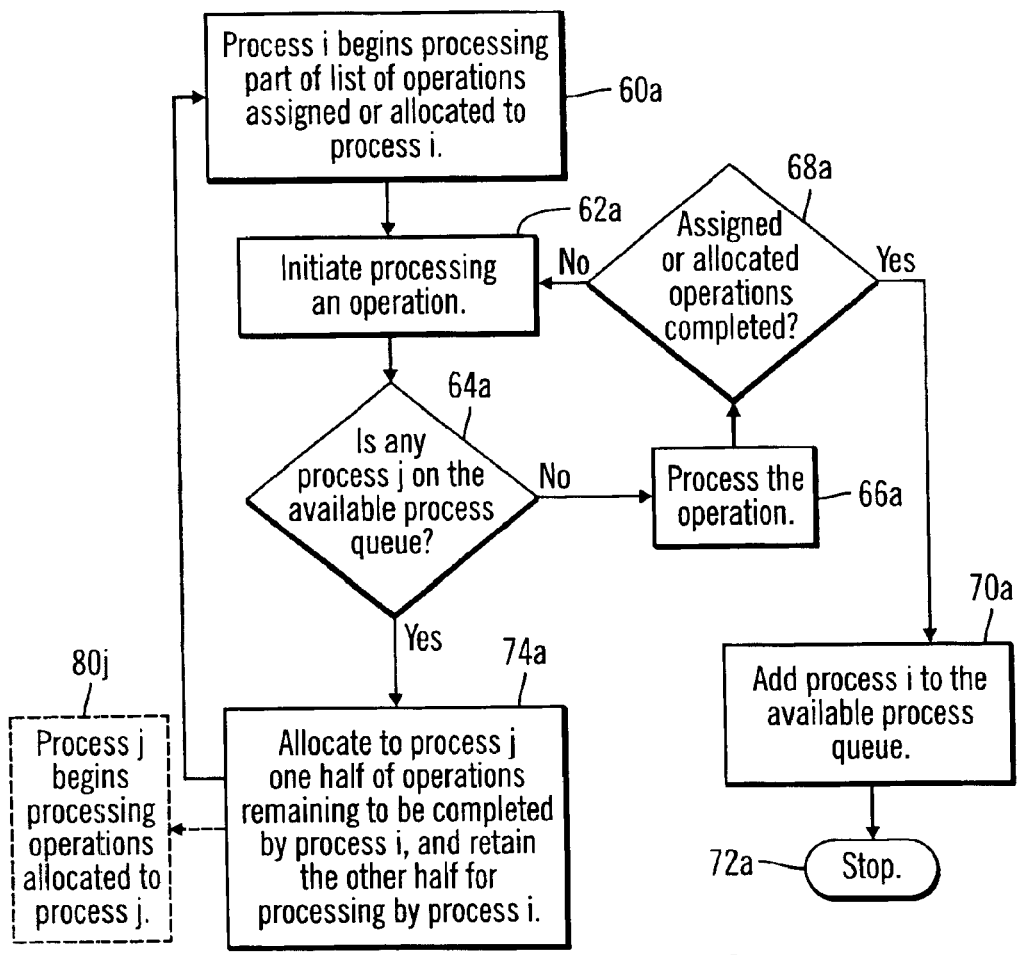
FIG. 6b illustrates logic for a process that increases processor utilization in accordance with certain implementations of the invention.

FIG. 6$a$ illustrates a computing environment in which certain aspects of the invention are implemented. A computational system 600 includes n processes 632$a$, 632$b$, ..., 632$i$, ... 632$n$. An allocator program 618 allocates the processes 632$a$ ... 632$n$ to perform operations indicated in a list of operations 622. The processes 632$a$ ... 632$n$ may enter and exit an available process queue 624.

FIG. 6$b$ illustrates logic for a process 632$i$ that increases processor utilization in accordance with certain implementations of the invention. A list of operations 622 needs to be processed by a number of processes 632$a$ ... 632$n$ running in parallel and some initial assignment of the list of operations 622 has been made among the processes 632$a$ ... 632$n$ by the allocator program 618. The logic of FIG. 6$b$ is executed in parallel by all the processes 632$a$ ... 632$n$.

At block 60$a$, process 632$i$ begins processing part of list of operations 622 assigned or allocated to process 632$i$. The process 632$i$, initiates (at block 62$a$) processing part of the list of operations 618. At block 64$a$, the process 632$i$ determines if any process j is on an available process queue 624. If not, process 632$i$ performs (at block 66$a$) part of the operations and determines (at block 68$a$) if the entire operations allocated or assigned to process 632$i$ have been completed. If so, process 632$i$ adds (at block 70$a$) process 632$i$ to the available process queue 624 and stops (at block 72$a$). If not, control returns to block 62$a$ where process 632$i$ initiates the processing of another part of the operations assigned or allocated to process 632$i$.

If at block 64$a$ a process j is available on the available process queue, the process 632$i$ divides the part of the operations that has not been completely processed by process 632$i$ into two. The process 632$i$ allocates one half of the operations to process j and retains the other half for processing. Control returns to block 60$a$ and proceeds to block 80$j$ in parallel. At block 60$a$, the process 632$i$ continues to process the retained half of the operations. At block 80$j$ the process j removes process j from the available process queue 624 and commences processing the allocated one half of the operations.

A scan process may have to wait for accessing a track because the track is being used by some other process. By adopting the implemented process allocation mechanism, even if a scan process completes before all the other scan processes, the completed scan process is almost immediately utilized to scan the disk by reallocating operations from another scan process having incomplete operations. Processor utilization increases and the work of scanning the cache is distributed substantially equally among the scan processes. The scan process allocation mechanism is adaptive and if some entries of the hash table correspond to a significant amount of modified data in the cache, the implementation distributes those entries of the hash table among many processes. The process allocation mechanism is not limited to processes that scan a cache.

Additional Implementation Details

The described implementations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.)). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The preferred logic of FIGS. 4, 5, 6$b$ describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel.

In the described implementations, the disk drives 8$a$, 8$b$, ... 8$n$ comprised magnetic hard disk drives. In alternative implementations, the storage system 6 may comprise any storage system known in the art, such as optical disks, tapes, etc.

In the described implementations, the cache 12 comprised volatile memory and the storage system 6 to which tracks are destaged from cache comprised a non-volatile storage device. In alternative implementations, the cache 12 from which data is destaged and the storage to which destaged data is stored may comprise any volatile or non-volatile computer readable medium known in the art.

In the described implementations, the data was managed as tracks in cache. In alternative implementations, the data may be managed in data units other than tracks, such as a logical block address (LBA), etc.

In the described implementations, the list of entries comprised hash tables. In alternative implementations, different type of lists with different ordering schemes may be used. Furthermore, in the described implementations at block 74 and 74$a$ the incomplete operations was divided among two processes. In alternative implementation the incomplete operations may be divided among more than two processes.

The foregoing description of the described implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for increasing processor utilization, comprising:
  initially assigning operations to a plurality of processes for processing;
  adding a process to an available process queue in response to a completion of processing by the process;
  determining whether one or more processes are available in the available process queue if there are operations that have not been processed; and
  if one or more processes are determined to be available, then allocating selected operations between the process and at least one of the available processes, wherein the selected operations have been assigned to the process for processing but have not been processed by the process, and wherein initially assigning the operations further comprises:
    (i) maintaining a list of the operations, wherein the operations in the list have an unknown execution time; and
    (ii) assigning the operations in the list among the plurality of processes, wherein the processes are assigned at least one operation in the list, and wherein a first process and a second process are assigned an equal number of operations from the list.

2. The method of claim 1, wherein the operations are scan operations, wherein each scan operations scan a part of a cache.

3. The method of claim 2, wherein the operations are allocated from the list, wherein the list comprises a hash table, wherein an entry of the hash table has a pointer to a cache directory control block, and wherein the cache directory control block corresponds to a portion of the cache.

4. The method of claim 2, wherein after determining that no process is available in the available process queue, destaging tracks corresponding to one operation not processed.

5. The method of claim 2, wherein after determining that no process is available in the available process queue, discarding data corresponding to one operation not processed.

6. The method of claim 1, further comprising:
  executing the processes in parallel to process the assigned operations, wherein the assigned operations are a plurality of scan operations.

7. The method of claim 1, wherein the processes run on a plurality of central processing units.

8. A method for increasing processor utilization, comprising:
  initially assigning operations to a plurality of processes for processing;
  adding a first process to an available process queue in response to a completion of processing by the process;
  determining whether one or more processes are available in the available process queue if there are operations that have not been processed; and
  if one or more processes are determined to be available, then allocating selected operations between the process and at least one of the available processes, wherein the selected operations have been assigned to the process for processing but have not been processed by the process, wherein a first process is initially assigned a first set of operations to process, a second process is initially assigned a second set of operations to process, wherein the first set of operations and the second set of operations are equal in number, wherein a third process is in the available process queue, and wherein, unprocessed operations belonging to the first set of operations are allocated equally between the first process and the third process.

9. A system for increasing processor utilization, comprising:
  means for initially assigning operations to a plurality of processes for processing;
  means for adding a process to an available process queue in response to a completion of processing by the process;
  means for determining whether one or more processes are available in the available process queue if there are operations that have not been processed; and
  means for allocating selected operations between the process and at least one of the available processes, if one or more processes are determined to be available, wherein the selected operations have been assigned to the process for processing but have not been processed by the process, and wherein the means for initially assigning the operations further performs:
    (i) maintaining a list of the operations, wherein the operations in the list have an unknown execution time; and
    (ii) assigning the operations in the list among the plurality of processes, wherein the processes are assigned at least one operation in the list, and wherein a first process and a second process are assigned an equal number of operations from the list.

10. The system of claim 9, wherein the operations are scan operations, the system further comprising:
  a cache, wherein the scan operations scan a part of the cache.

11. The system of claim 10, wherein the operations are allocated from the list, wherein the list comprises a hash table, wherein an entry of the hash table has a pointer to a cache directory control block, and wherein the cache directory control block corresponds to a portion of the cache.

12. The system of claim 10, wherein after determining that no process is available in the available process queue, destaging tracks corresponding to one operation not processed.

13. The system of claim 10, wherein after determining that no process is available in the available process queue, discarding data corresponding to one operation not processed.

14. The system of claim 9, further comprising:
  means for executing the processes in parallel to process the assigned operations, wherein the assigned operations are a plurality of scan operations.

15. The system of claim 9, wherein the processes run on a plurality of central processing units.

16. A system for increasing processor utilization, comprising:
  means for initially assigning operations to a plurality of processes for processing;
  means for adding a process to an available process queue in response to a completion of processing by the process;
  means for determining whether one or more processes are available in the available process queue if there are operations that have not been processed; and
  means for allocating selected operations between the process and at least one of the available processes, if one or more processes are determined to be available, wherein the selected operations have been assigned to the process for processing but have not been processed by the process, wherein a first process is initially assigned a first set of operations to process, a second process is initially assigned a second set of operations to process, wherein the first set of operations and the second set of operations are equal in number, wherein a third process is in the available process queue, and wherein unprocessed operations belonging to the first set of operations are allocated equally between the first process and the third process.

17. An article of manufacture, wherein the article of manufacture is capable of causing operations, the operations comprising:
  initially assigning operations to a plurality of process for processing;
  adding a process to an available process queue in response to a completion of processing by the process;
  determining whether one or more processes are available in the available process queue if there are operations that have not been processed; and
  if one or more processes are determined to be available, the allocating selected operations between the process and at least one of the available processes, wherein the selected operations have been assigned to the process for processing but have not been processed by the process, and wherein initially assigning the operations further comprises:
    (i) maintaining a list of the operations, wherein the operations in the list have an unknown execution time; and
    (ii) assigning the operations in the list among the plurality of processes, wherein the processes are assigned at least one operation in the list, wherein a first process and a second process are assigned an equal number of operations from the list.

18. The article of manufacture of claim 17, wherein the operations are scan operations, wherein the scan operations scan a part of a cache.

19. The article of manufacture of claim 18, wherein the operations are allocated from the list, wherein the list comprises a hash table, wherein an entry of the hash table has a pointer to a cache directory control block, and wherein the cache directory control block corresponds to a portion of the cache.

20. The article of manufacture of claim 18, wherein after determining that no process is available in the available process queue, destaging tracks corresponding to one operation not processed.

21. The article of manufacture of claim 18, wherein after determining that no process is available in the available process queue, discarding data corresponding to one operation not processed.

22. The article of manufacture of claim 17, the operations further comprising:
  executing the processes in parallel to process the assigned operations, wherein the assigned operations are a plurality of scan operations.

23. The article of manufacture of claim 17, wherein the processes run on a plurality of central processing units.

24. An article of manufacture, wherein the article of manufacture is capable of causing operations, the operations comprising:
  initially assigning operations to a plurality of processes for processing;
  adding a process to an available process queue in response to a completion of processing by the process;
  determining whether one or more processes are available in the available process queue if there are operations that have not been processed; and
  if one or more processes are determined to be available, the allocating selected operations between the process and at least one of the available processes, wherein the selected operations have been assigned to the process for processing but have not been processed by the process, wherein a first process is initially assigned a first set of operations to process, a second process is initially assigned a second set of operations to process, wherein the first set of operations and the second set of operations are equal in number, wherein a third process is in the available process queue, and wherein unprocessed operations belonging to the first set of operations are allocated equally between the first process and the third process.

* * * * *

UNITED STATES PATENT AND TRADEMARK OFFICE
CERTIFICATE OF CORRECTION

| | | |
|---|---|---|
| PATENT NO. | : 6,948,009 B2 | Page 1 of 1 |
| APPLICATION NO. | : 10/163219 | |
| DATED | : September 20, 2005 | |
| INVENTOR(S) | : Thomas Charles Jarvis et al. | |

It is certified that error appears in the above-identified patent and that said Letters Patent is hereby corrected as shown below:

<u>Column 9</u>, line 15, delete "of process" and insert -- of processes -- .
Line 23, delete "the allocating" and insert -- then allocating -- .

<u>Column 10</u>, line 30, delete "the allocating" and insert -- then allocating -- .

Signed and Sealed this

Twenty-second Day of May, 2007

JON W. DUDAS
*Director of the United States Patent and Trademark Office*